United States Patent
Masloff

[19]

[11] Patent Number: 5,293,898
[45] Date of Patent: Mar. 15, 1994

[54] SAFETY CUT-OUT

[75] Inventor: Peter Masloff, Trausdorf, Austria

[73] Assignee: Pipelife Rohrsysteme Gesellschaft m.b.H., Krems, Austria

[21] Appl. No.: 836,275

[22] PCT Filed: Jul. 3, 1991

[86] PCT No.: PCT/AT91/00082

§ 371 Date: Mar. 2, 1992

§ 102(e) Date: Mar. 2, 1992

[87] PCT Pub. No.: WO92/01184

PCT Pub. Date: Jan. 23, 1992

[30] Foreign Application Priority Data

Jul. 6, 1990 [AT] Austria .................. 1442/90
Dec. 21, 1990 [AT] Austria .................. 2620/90

[51] Int. Cl.$^5$ .............................................. F16K 17/30
[52] U.S. Cl. ...................................... 137/517; 137/498
[58] Field of Search ............................ 137/498, 517

[56]  References Cited

U.S. PATENT DOCUMENTS

| 1,163,128 | 12/1915 | Braver ....................... 137/517 |
| 2,404,924 | 7/1946 | Sacchini ................. 137/517 X |
| 2,526,346 | 10/1950 | Goldinger . | |
| 2,926,690 | 3/1960 | Martin ........................ 137/460 |
| 3,583,435 | 6/1971 | Stewart ...................... 137/551 |
| 3,794,077 | 2/1974 | Fanshier ................... 137/513.3 |
| 4,934,405 | 6/1990 | Brownfield ................. 137/517 |

FOREIGN PATENT DOCUMENTS

| 960700 | 3/1957 | Fed. Rep. of Germany ...... 137/517 |
| 1020504 | 12/1957 | Fed. Rep. of Germany . |
| 2101765 | 8/1972 | Fed. Rep. of Germany ...... 137/517 |
| 2603408 | 8/1985 | Fed. Rep. of Germany . |
| 3518430A1 | 11/1985 | Fed. Rep. of Germany . |
| 1398966 | 4/1965 | France . |
| 1603246 | 4/1971 | France . |
| 586294 | 12/1958 | Italy .................................. 137/517 |

*Primary Examiner*—Robert G. Nilson
*Attorney, Agent, or Firm*—Nixon & Vanderhye

[57] ABSTRACT

In a safety closing device for gas pipe systems (1) with a valve (2) which is capable of being pressed against a valve seating (9) in a housing, especially a tubular housing, the valve (2), as a disc valve capable of being moved in the axial direction of the tubular housing (1), is movably supported against the force of a spring (5). The cross-section area of the valve head (7) is made smaller than the clear cross section of the housing (1) and is kept at a distance from the inner wall of the tubular housing, and, furthermore, the gas supply connection (20) is provided on the side of the valve head (7) facing away from the spring (5).

9 Claims, 5 Drawing Sheets

SAFETY CUT-OUT

The invention relates to a safety closing device for gas pipes comprising a valve which is capable of being pressed against a valve seating in a housing, especially a tubular housing.

For water pipe systems devices have already been disclosed which are placed between an offtake tap and a consuming device connected thereto by a hose for the purpose of ensuring that, if the connected hose bursts, an excessive amount of water cannot flow out. Such water cut-off valves take into account the fact that, when a hose bursts, the pressure drops quickly and at the same time a greater-than-normal quantity of water is taken. It is thus ensured that, in the event of a sudden drop in pressure, only a certain maximum amount of fluid flows out, whereupon the safety valve closes. With such devices it is possible, for instance, to provide a safeguard for household appliances such as washing machines, dishwashers and the like which are usually connected only to flexible hoses.

In the case of gas pipe systems it often happens, when construction work is being carried out on buildings, that the pipe system is accidentally damaged. In such cases there is the possibility of an unintentional emission of gas and hence a danger of explosion. In gas pipe systems, too, there are consuming devices, such as heating systems, which are designed to take gas for the burners from the pipe system until the desired temperature is reached. Monitoring of such gas pipes by means of a gas meter does not achieve the aim because, depending on the outdoor temperature, heating systems have to be supplied with gas for a longer period and hence with a larger total quantity of gas at times of lower outdoor temperatures than when they are higher.

The purpose of the invention is to make a safety closing device for gas pipe systems of the kind mentioned at the beginning which enables damage in a pipe system to be detected without causing premature shutting-off of the gas pipes if a consuming device needs to receive a quantity of gas corresponding to its rated output for a fairly long period of time. The safety closing device according to the invention is intended, in particular, to be suitable for safeguarding multi-family houses in which a large number of consuming devices take gas from the gas pipe system at irregular times. In order to solve the aforesaid problem the safety closing device according to the invention is primarily based on the fact that the valve, as a disc valve movable in the axial direction of the tubular housing, is movably supported against the force of a spring, that the cross-sectional area of the valve head is smaller than the clear cross-section of the housing and is kept at a distance from the inner wall of the tubular housing and that the gas supply connection is provided on the side of the valve head facing away from the spring. As a result of the fact that a disc valve movably supported against the force of a spring is provided, a certain differential pressure is predetermined through appropriate setting of the initial spring tension or elastic force, this differential force being characteristic of damage in the subsequent pipe system. As soon as the pressure in the subsequent pipe system falls for a short time below a limit value, the safety closing device according to the invention closes and, as only mechanical parts are provided for the safety closing device, such a safety closing device remains capable of operation even in the event of natural catastrophes such as, for instance, earthquakes.

Alternative systems which require remote-control valves which are actuated, for instance, depending on signals from a gas detector, rely on an electric circuit which is in working order and thus as a rule become inoperative at the latest if at the same time electrical circuits are destroyed or the power supply breaks down. On the other hand, the design according to the invention is characterised by the fact that it remains independently capable of operation even in the event of catastrophes. The safety closing device according to the invention can be provided in the immediate vicinity of the branching-off of a house service line from the gas main and/or at branching points in the main system in all pipe runs, so that any gas escape is kept to a minimum.

For the safe operation of such a safety valve which responds in this way solely to the pressure difference in the pipe system before and after the valve, it is necessary to observe a minimum spacing from the housing in the area of the valve head, which spacing delimits the cross-section allowing free passage of the gas. The subsequent bearing components must be so placed that no appreciable constriction takes place behind the valve seating in the area of the safety valve, in order to ensure rapid response to an inadmissible pressure drop. Owing to the fact that the design is such that the disc valve closes against the force of a spring and that the gas supply connection is provided on the side of the valve head opposite to the spring, it is possible, after an inadmissible pressure drop and a closing of the valve, to reset the operating position of the valve head by the application of a counterpressure in the consumer pipe system, so that no further shutting-off measures in the gas pipe system are required for the restarting operation. The valve can therefore also be placed in a relatively inaccessible place—for instance, immediately adjacent to a house service connection to a gas main. The safety closing device according to the invention can thus, owing to the way in which it responds to a corresponding differential pressure in pipe systems, be used with a regulated or an unregulated supply pressure.

According to a preferred embodiment of the safety closing device according to the invention, the device is so designed that the valve stem is supported in an axially movable manner in sliding bearings. Such sliding bearings can be made maintenance-free, so that the safety closing device can remain without maintenance in an inaccessible place for long periods. It is simple in this connection to design the spring as a spiral spring and to dispose it concentrically with the valve stem, it being advantageous that the design should be such that the valve stem comprises, in the vicinity of the valve seating, a spring retainer, especially a shoulder, and that the free end of the spiral spring facing away from the spring retainer is supported against a sliding bearing for the valve stem. This ensures reliable axial guidance of the valve stem and hence precise definition of the free throughflow cross-section on the circumference of the valve head in the opened position of the valve.

In order to avoid any impairment of the sensitivity of response, it is advantageous to ensure that no further constriction is possible in the connection to the valve seating inside the safety closing device, for which purpose it is advantageous to design the device in such a way that the sliding bearing or bearings is (are) fixed in perforated discs or to radial struts connected to the housing. Similar considerations apply to the valve seating, in which connection it is advantageous to make the design here such that the valve seating is constructed as an annular disc with essentially conical seating surfaces and that a central sliding bearing for the valve stem is connected to the annular disc leaving a cross-section area for the passage of gas.

In order to ensure safe gastight contact of the valve head against the valve seating, the design can advantageously be so devised that the valve seating and/or the seating surface of the valve head working together with the valve seating has (have) curved generatrices.

In order to enable the maximum permissible differential pressure in each case to be adapted to the type, nature and quantity of the consuming devices, it is advantageous to design the closing device in such a way that the elastic force of the spring and/or the closing travel of the valve are adjustable.

According to a preferred embodiment the design is such that the spring for acting on the valve head is designed with a progressive spring characteristic. By designing the spring with a progressive spring characteristic the sensitivity of response can be so chosen that, when a pressure difference indicating damage is exceeded, a relatively rapid closing movement takes place via a first spring travel, causing the throughflow crossection to be restricted in the region of the valve head, thus quickly further increasing the pressure difference and hence bringing about a safe closing movement of the safety closing device according to the invention.

In order to keep turbulences in the gas flow to a minimum in the region of the safety closing device and especially in the region of the valve head, the design can be advantageously made so that the surface of the valve head facing away from the spring comprises curved, in particular convexly curved, guide surfaces. By means of such guide surfaces, for instance in the form of a cowl corresponding to the shape of an aircraft nose, the most laminar possible flow is maintained in the region of the valve head, too, and suction effects caused by turbulence which are liable to lead on the one hand to an unstable position of the valve head and on the other hand to influencing of the pressure difference which actuates the safety closing device are excluded to the greatest possible extent. In addition to such a streamlined design of the surface of the valve head facing away from the spring, it is also preferable, in order to further improve the flow properties especially with regard to avoidance of turbulence in the region of the valve head, to make the design such that the region of the valve stem adjacent to the valve seating starts directly from the valve seating surfaces of the valve head and decreases continually to the diameter of the valve stem.

For the reliable operation of gas meters and owing to the fact that absolute gastightness is almost unachievable, it is laid down in relevant regulations that a certain quantity of leakage gas, which is for instance 30 l/h, can be tolerated in the case of gas-consuming devices. As stated above, after the safety closing device according to the invention has been actuated owing to damage to a pipe or to excessive emission of gas at a damaged consuming device, the disc valve is opened after the pipe in question has been repaired by the building up, on the consuming-device side, of a pressure greater than the pressure in the pipe system, causing the valve head to lift away from the valve seating and thus reopening the throughflow cross section and hence the pipe system. Such opening by a build-up of pressure on the consuming-device side is generally accompanied by a corresponding check by the operator of the gas supply system and is thus usually very time consuming. As a precaution in case of unintentional operation of an opening valve causing the safety closing device to be actuated and hence the consuming device to be cut off from the gas main, the device can, account being taken of the permitted quantities of leakage gas, preferably be so designed that the valve head comprises a leakage-gas hole and/or the seating surface can be pressed in a non-gastight manner against the valve seating, the leakage gas quantity being kept below 30 l/h. In this case, after the consumer-device pipe system has been closed, an appropriate build-up of pressure on the consuming-device side can take place within a short time owing to the leakage-gas hole or the non-gastight resting of the valve head against the valve seating, so that a pressure equalisation will take place in the region of the valve head and the elastic force will cause the disc valve to be reopened. The leakage-gas quantity laid down in the corresponding safety regulations is far below a quantity of gas which would flow out in the event of a pipe or a consuming device actually becoming damaged, so that the gastightness of the pipe system on the consuming-device side is in any case a precondition in the event of automatic opening of the safety closing device according to the invention due to the quantity of leakage gas passing through.

In order to ensure an accurate response characteristic and sure closing of the safety closing device even when there are relatively small differential pressures, especially where there are a large number of consuming devices following each other, a number of marginal conditions appear to be of essential importance. The burning gas distributed via gas pipe systems may, especially in the case of systems which contain a large number of old pipe sections, carry with them a number of solid bodies, especially rust. Such solid bodies usually manifest themselves by premature clogging of burner jets. A deposit of such solid bodies in the region of the bearing of the valve stem may, however, lead to increased valve friction or even to sticking of the valve stem due to corrosion, with the result that the operation of the safety closing device would no longer be ensured. In order to prevent such sticking of solid substances in the region of the bearing of the valve stem, it is advantageous to design the device in such a way that the valve stem has ribs or grooves running in the longitudinal direction thereof. Alternatively, however, the sliding bearing can also be improved by having the sliding bearing or bearings for the valve stem composed of—preferably three—radial struts, which struts extend in the axial direction of the valve stem. In both cases the surface guided in the bearing is reduced and space remains, alongside the bearing surfaces, for the scraping away of impurities.

The shaping of the valve and the design of the valve seating and also the minimum dimension of a valve stem and the nature of its bearings naturally produce, in the direction of flow, a constricting effect which per se, leads to a pressure drop following the valve seating. In order to minimise the effects of such a pressure drop on the reliability of response of the safety closing device, it is advantageous to design the device in such a way that the cross-sectional area of the region adjacent to the valve head in the direction opposite to that of the gas supply connection increases, preferably continuously, with the generatrices of the conically widening region preferably enclosing, with the axis, an angle of 3° to 10°, preferably 5°. In this way, after the constricting point defined by the valve seating, the pressure is restored to nearly its original level and the pressure loss due to the constriction is kept particularly low. Altogether, in conjunction with the measure of making the sliding bearing of struts running in the axial direction, this also enables the most laminar possible flow to be maintained, eliminating impairments of the safety closing device due to turbulences following the valve seating. The formation of such turbulences can, however, also be reduced by having the angle enclosed by the generatrices of the conical seating surfaces of the valve seating with the axis inversely proportional to the pressure in the gas supply pipe system. Especially for use in low-pressure pipe systems, i.e. with pressures not exceeding 1 bar, optimal operation can advantageously be achieved in this connection with a cone angle of the seating surfaces of about 45° to the axis of the valve, and in medium-pressure pipe systems, i.e. in pipe systems in which the pressure is between 1 and 4 bar, advantageously with a seating-surface cone angle of about 30°. In the region of the valve seating it is necessary to maintain a minimum velocity of the gas flowing through in order to prevent the formation of turbulences which would influence the flow. With the maintenance of an unchanged valve lift, different inclination of the seating surfaces makes it possible to define a cross-section area for the gas throughflow corresponding to the pressure in the gas supply pipe system, which cross-section area, as a constriction point, causes an increase in the speed of the gas particles to the necessary velocity. It is thus possible, when there are higher nominal pressures in the gas supply system, to use seating areas which enclose a smaller angle with the axis and are thus steeper, i.e. delimiting a greater throughflow cross-section, because, owing to the higher nominal pressure, the gas velocity is already at a higher level.

The minimum velocity necessary for avoiding turbulence must in this connection be primarily achievable only in the immediate vicinity of the seating area over a short section and the arrangement should, according to a preferred embodiment, be so designed that the seating areas of the valve head on the side away from the gas supply pipe is followed by a stepped-back region following the valve head defining a cross-section which increases—especially conically—in order to keep the pressure drop caused by the constriction point as low as possible.

In order to prevent the penetration of solid matter, especially rust, it is possible to fit a filter, in the conventional manner, on the side of the valve head towards the connection with the gas supply pipe.

In order to protect the spring against the depositing of particles of solid matter, especially rust, carried with the gas and to prevent the accumulation of the particles of solid matter on the spring, which would lead to a change in the spring characteristic, the design should preferably be such that the spring is placed in a recess in the valve stem and the sliding bearing facing away from the gas supply line is composed of a spring retainer placed on a bolt and penetrating into the hollow valve stem. With such a spring entering into a recess in the valve stem, it is a simple matter to achieve a damping effect if the spring retainer and/or bolt projecting into the hollow valve stem comprises a constricting point between the recess in the valve stem which receives the spring and the pipe, corresponding to a preferred embodiment of the safety closing device according to the intention. Owing to the fact that the recess in the hollow valve stem receiving the spring is connected with the inside of the pipe via a constricting point, there is formed in the hollow valve stem an additional cushion of gas which assists the elastic force during the closing of the valve. Thus, if the hole constituting the constricting point is appropriately dimensioned, the effect of the gas cushion can be adjusted to the corresponding conditions, for instance the nominal pressure prevailing in the gas pipe.

BRIEF DESCRIPTION OF THE DRAWINGS

The safety closing device according to the invention will now be explained in greater detail with reference to examples of the embodiment shown schematically in the drawings. In the drawings.

DETAILED DESCRIPTION OF THE DRAWINGS

Figure 1:
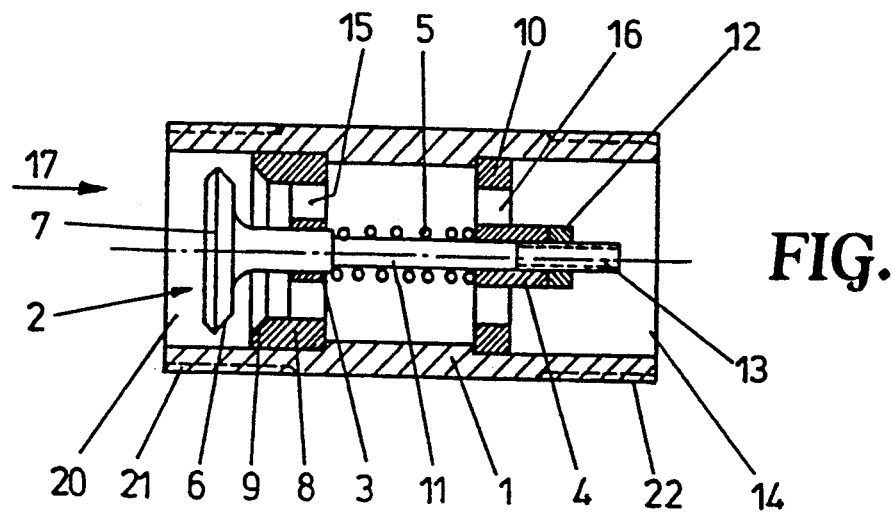
FIG. 1 shows a section through a first embodiment of a safety closing device according to the invention placed in a pipe.

In FIG. 1 valve 2 consisting of disc valve movably supported, in a pipe or pipe section 1, in sliding bearings 3 and 4 in the axial direction of the pipe 1 and of the valve 2 against the force of a spiral spring 5. The seating surface, 6 of the valve head 7 operates together with a valve seating or seat 9 formed in an annular disc 8 fixed in the pipe, the annular disc 8 serving at the same time as a support for the sliding bearing 3. The sliding bearing 3 can either be supported via stays or struts running in the radial direction or the annular disc 8 can be made with apertures or punctures, as shown in further detail in FIG. 4 for the support or annular disc 10 for the end of the valve stem facing away from the valve head 7. For the purpose of adjusting the closing travel of the valve 2, there is provided on the free end of the valve stem 11 a nut 12 which can be screwed onto a schematically indicated thread 13 of the valve stem 11. A similar adjusting device, consisting for instance of a nut, can be provided in the region between the sliding bearings 3 and 4 for the purpose of adjusting the spring tension.

The cross-section area of the valve head 7 or the throughflow cross section between the seating surfaces 6 and 9 is adapted, in the open state of the valve, to the consuming devices connected on the consumer side, indicated by 14. Care must be taken at the same time to ensure that the punctures or perforations 15 and 16 in the region of the supports of the sliding bearings 3 and 4 are substantially at least equal to the throughflow cross section between the seating surfaces 6 and 9 in the region of the valve head 7, in order to avoid a constricting effect following the valve head in the direction of flow indicated by 17. The cross-section area of the valve head in relation to the clear cross-section of the pipe 1 and the spring tension are so dimensioned that, in the event of a pressure drop exceeding a pressure drop which is brought about when all the consuming devices are operating, suggesting damage to the pipe section on the consumer side, for instance due to building work, the valve 2 automatically closes, thus preventing a further supply of gas. When the valve is placed in the region of branch connections in the gas main, the pressure difference to be exceeded is adjusted to the maximum possible consumption of all the consuming devices in the pipe section in question.

Figure 2:
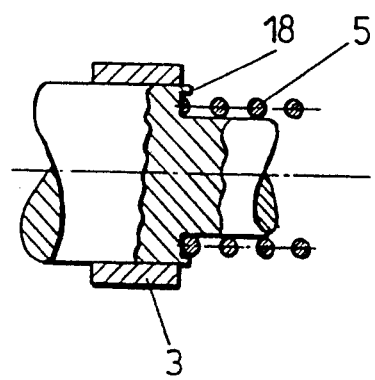
FIG. 2, on a larger scale, is a partial cross-section illustration of the spring retainer of the disc valve shown in FIG. 1.

FIG. 2 shows, on a larger scale, the region of the valve or the valve stem 11 in the vicinity of the front sliding bearing 3 viewed in the direction of flow, showing clearly a stepped back area or annular slot 18 for securely receiving and guiding the spring 5, which is only schematically indicated.

Figure 3:
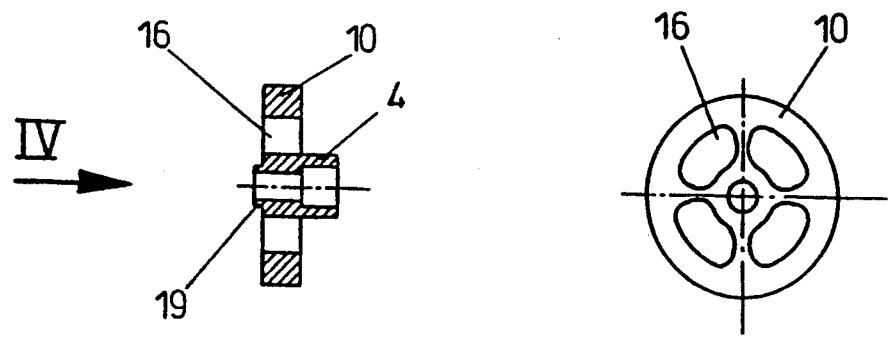
FIG. 3 shows in detail the construction of the sliding bearing for the free end, facing away from the valve head, of the valve stem shown in FIG. 1.
Figure 4:
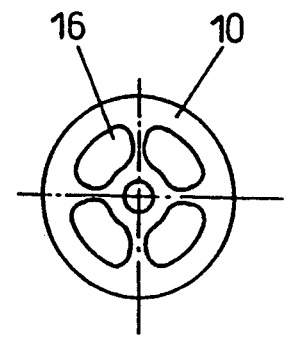
FIG. 4 is a view in the direction of the arrow IV in FIG. 3.

The annular disc or perforated disk 10 shown in FIGS. 3 and 4, which carries the sliding bearing 4 for the free end of the valve stem, not shown in detail, also comprises a guide for the spring, not shown in greater detail, consisting of an axial extension 19. Furthermore, the view presented in FIG. 4 mainly shows the recesses or throughflow apertures 16.

For proper sealing when the valve is closed, at least one of the seating surfaces 6 and 9 comprises curved generatrices, so that when the valve is closed there is a linear contact between the seating surfaces 6 and 9. After a closing of the safety valve, and following a subsequent repair of the pipe system on the consuming-device side, the valve is re-opened by application of a gas pressure on the consumer side 14 exceeding the pressure on the supply side 20 and with assistance from the spring tension, so that it is unnecessary to dig out or expose the valve 2, which is usually placed in an inaccessible place.

As can be seen from FIG. 1, the pipe section in which the valve is placed has at its ends schematically indicated threads 21 and 22 for making a screw connection with the connecting pipes. The safety valve 2 is advantageously placed in the immediate vicinity of the connection of a consuming-devices pipe system to a main pipe or to the branches in the main pipe system.

Figure 5:
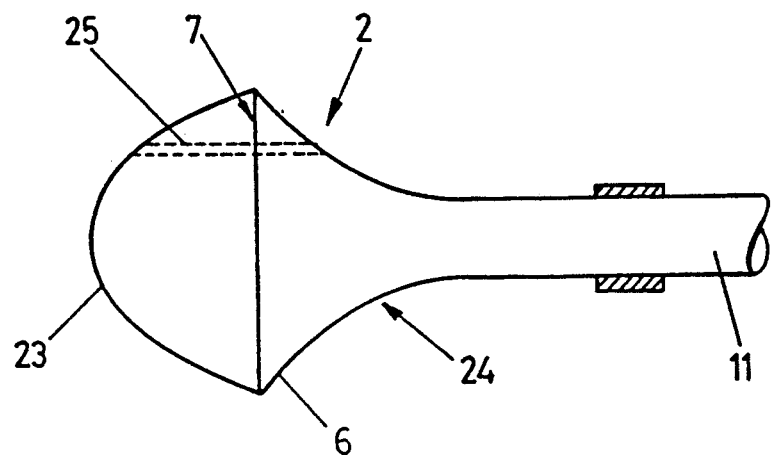
FIG. 5 is a schematic presentation of a modified embodiment of the valve head for a safety closing device according to the invention.

In the case of the modified example of embodiment of the valve 2 shown in FIG. 5, only the region of the valve head 7 with the stem 11 attached thereto is illustrated. The valve head comprises, on the side away from the stem or from the spring (not shown), guide surfaces 23 which are made in a convexly curved form and have approximately the shape of a cowl. Turbulences in the region of the seating surface 6 of the valve 2 are thus avoided. To achieve a largely laminar flow, not only are guide surfaces 23 provided in the region of the supply side but the region 24 immediately adjacent to the valve seating 6 is shaped, following on from the valve head, with a continuously decreasing diameter, so that, starting from the valve seating 6, a smooth and continuous surface is formed in order to achieve a substantially laminar flow. Furthermore, in the embodiment shown in FIG. 5, there is indicated a leakage-gas hole 25 whose size is adjusted to comply with the relevant safety regulations. Alternatively or in addition to this leakage-gas hole, the valve seating surface can be pressable in a non-gastight manner to the seating surface 9 (not shown in detail) of the valve seating.

Figure 6:
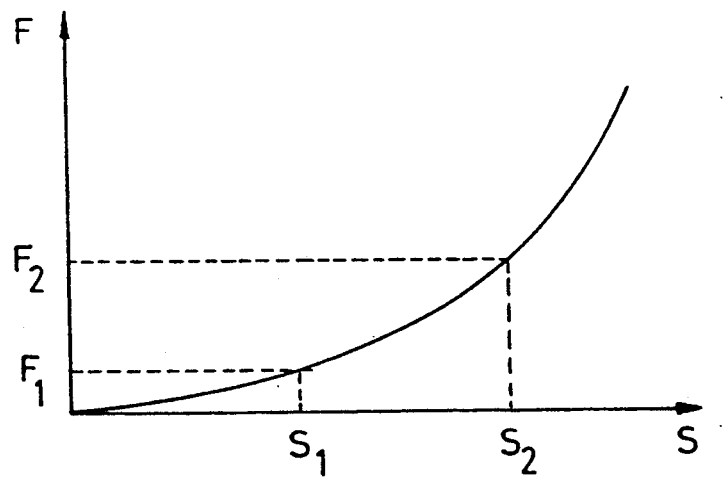
FIG. 6 is a diagram of the spring characteristic of a spring with a progressive spring characteristic for acting on the valve.

FIG. 6 shows a progressive spring characteristic for a spring for acting on the disc valve. In the event of a pressure drop, the valve head 7, when there is a spring tension $F_1$, travels a longer distance $S_1$, causing the throughflow cross section in the region of the valve head or the valve seating to be quickly reduced, thus bringing about a more rapid rise in the differential-pressure closing force and hence, altogether, making possible a faster and more reliable response of the safety closing device. At the same time a valve subject to the action of a spring which has such a spring characteristic is held in a stable position in the operating state.

The safety closing device comprising the valve can be fitted into the pipes in question by means of a threaded connection, a flange connection or welded joints, and welded joints can also be provided when polyethylene pipes are used.

Figure 7:
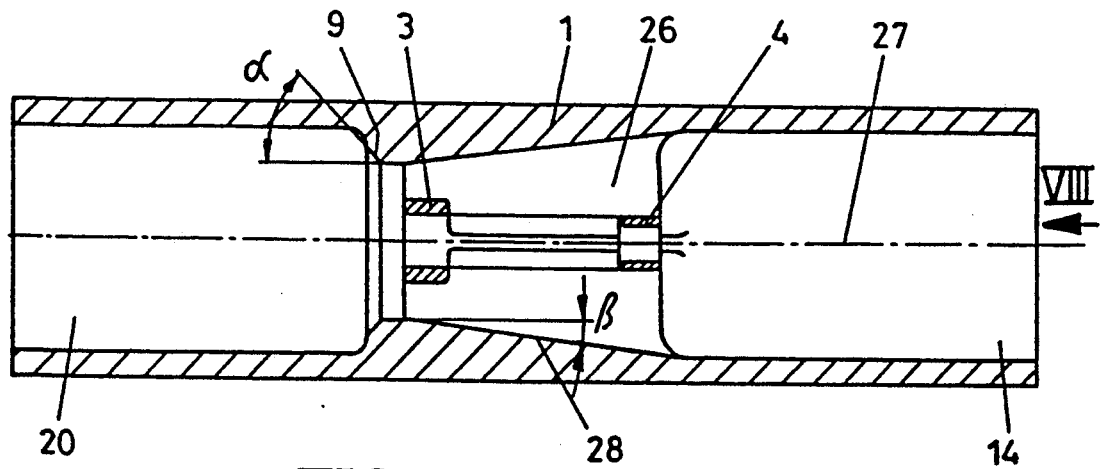
FIG. 7 is a section through a modified embodiment of a tubular housing of a safety closing device according to the invention without the movable disc valve.
Figure 8:
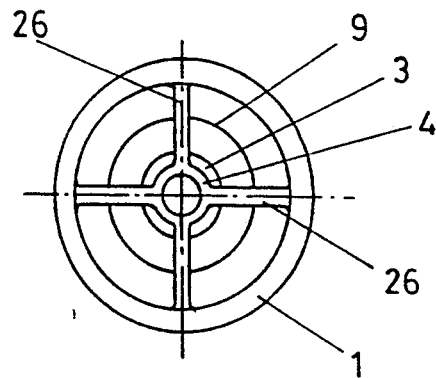
FIG. 8 is a view in the direction of arrow VIII in FIG. 7.
Figure 10:
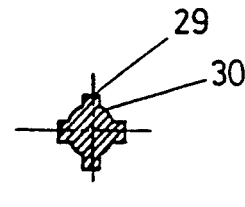
FIG. 10 is a section along the line X—X of FIG. 9 through a part of the valve stem of the disc valve shown in FIG. 9.
Figure 9:
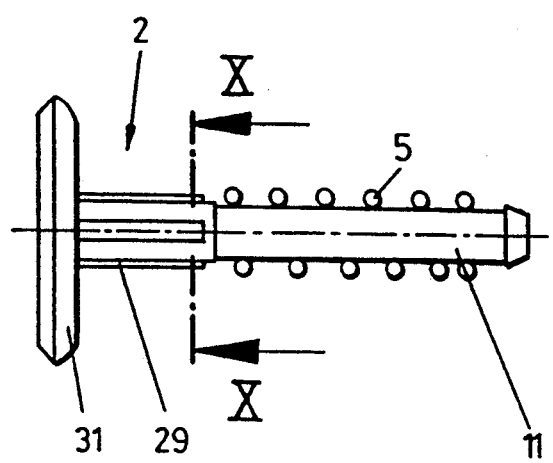
FIG. 9 is a side view of the disc valve which can be used in the housing shown in FIG. 7, on a different scale.

In FIGS. 7 and 8 the reference 1 again indicates the pipe section or the tubular housing for the safety closing device. For supporting the disc valve, which is illustrated in even greater detail in FIG. 9, there are again provided in this embodiment sliding bearings 3 and 4, which, as can be seen particularly from the view in FIG. 8, are held via ribs or struts 26 running substantially in the radial direction. Owing to the substantially radial struts 26 the formation of a laminar flow in the region of the safety closing device is promoted. In the example of embodiment shown in FIGS. 7 to 10, which is used especially in low-pressure pipes, i.e. at pressures not exceeding 1 bar, generatrices of the region 9 of the valve seating enclose, with a line parallel to the axis 27 of the valve stem and of the tubular section 1, an angle $\alpha$, which is around 45°. In addition to the conical form of the valve seating 9, the construction following the valve seating on the side away from the gas supply 20 is such that the cross-section area of the throughflow cross section in the region adjacent to the valve seating 9 constantly increases again, with the generatrices 28 of the substantially conical region enclosing with a line parallel to the axis 27, an angle $\beta$ which, in the example of embodiment shown, is about 5°. Owing to the continuous increase in the cross-section areas adjacent to the valve seating, the pressure loss caused in the region of the valve seating is again counterbalanced to the greater possible extent, so that the pressure difference between the gas supply side 20 and the consumer side 14 becomes negligible. In conjunction with the substantially radial struts 26, this measure, too, promotes the formation of a laminar flow on the consumer side 14 with the greatest possible avoidance of turbulence. If struts 26 are used to support the sliding bearings 3 and 4, the annular discs 8 and 10 shown in FIG. 1, which support the sliding bearings 3 and 4, can be dispensed with.

The disc valve 2 shown in FIG. 9 again comprises a stepped-in valve stem 11 for securing a spring (not shown), the end of the valve stem 11 facing towards the gas supply side 20 comprising, in the region of interaction with it, ribs 29, on its external circumference, running in the longitudinal direction of said valve stem. The use of ribs 29, especially owing to the recesses or grooves 30 left between them, created the possibility of removing again any particles of solid matter contained in the gas which may have accumulated in the region of the sliding bearing 3, thus preventing the disc valve from becoming stuck in the sliding bearing owing to corrosion.

Instead of the construction with ribs 29 in the region of the sliding bearing, the construction can alternatively be such that the sliding bearing itself is formed by the free front surfaces of the struts 26, said struts being directly supported on the external circumference of the valve stem 11. The valve head 31 of the disc valve 2, similarly to its form as shown in FIG. 1, is made to taper on the side facing towards the gas supply 20.

Figure 11:
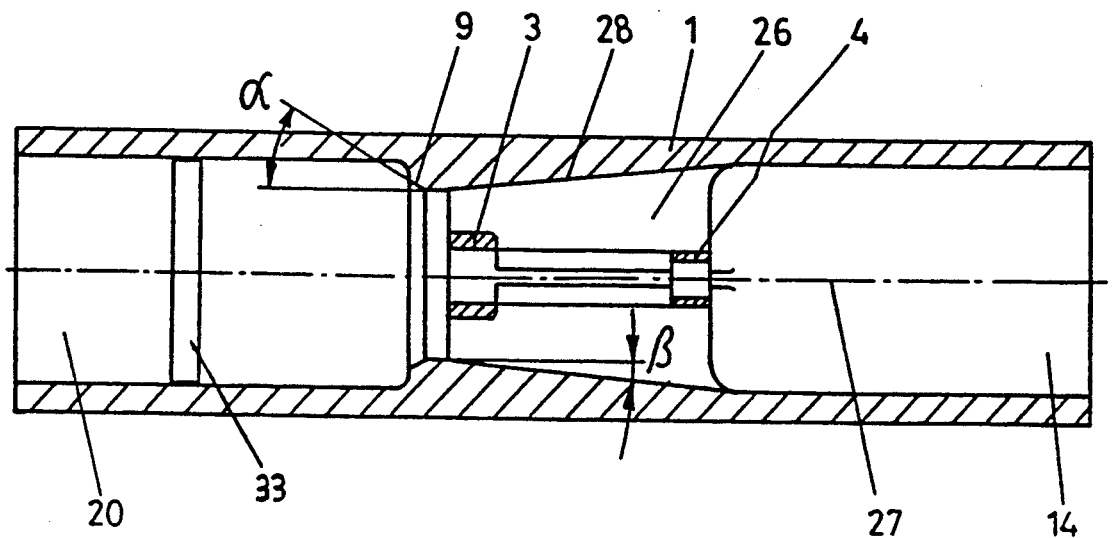
FIG. 11 is a section through a further modified embodiment, in a presentation similar to FIG. 7, through a housing of a safety closing device according to the invention, especially for use in medium-pressure pipes.
Figure 12:
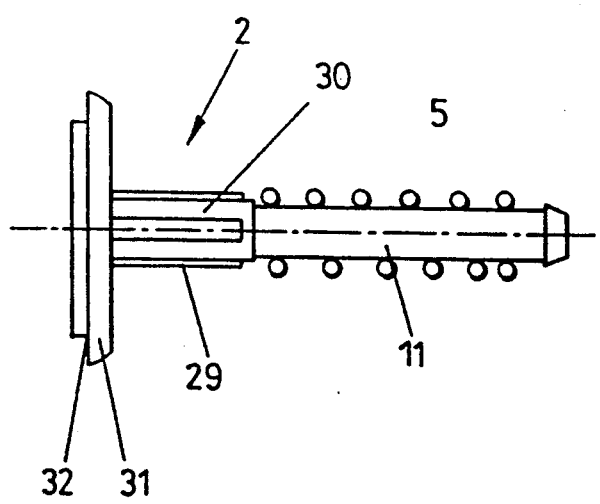
FIG. 12 is a side view similar to FIG. 9 of a disc valve which can be used in the housing shown in FIG. 11.

In the illustration given in FIG. 11, the reference numbers used for the similar embodiment shown in FIG. 7 are retained for the same component parts. In this embodiment, too, the sliding bearings 3 and 4 are supported by struts 26 running in a substantially radial direction. In order to prevent any appreciable pressure loss in the region of the valve 2 the design in this embodiment, too, is such that in the region following the valve seating the cross-section area steadily increases, as is again indicated by the angle $\beta$ between the axis 27 and the limiting surfaces 28. Furthermore, in the region of the valve seating, the generatrices of the region 9 again enclose, with a line parallel to the axis 27, an angle $\alpha$ which, in the example of embodiment shown, which is to be used especially for medium-pressure pipes, i.e. for pressures between 1 and 4 bar, is about 30°. The disc valve 2, shown in FIG. 12, usable when the example of embodiment shown in FIG. 11 is employed, comprises on the external circumference of the valve stem 11 in the region where this interacts with the sliding bearing 3, again substantially radial ribs 29 and grooves or recesses 30 between them. In this example of embodiment the valve head 31 is stepped-in on the side facing the gas supply 20, as is indicated by 32, in order, for instance, to accommodate an attachable flow guide device.

In addition to the formation of ribs 29 on the external circumference of the valve stem, or the supporting of the valve stem by means of substantially radial struts or ribs in order to prevent the safety closing device from becoming stuck through corrosion due to particles of solid matter carried in the gas, there is provided, as an additional safeguard, a filter 33 placed immediately preceding the valve seating or the disc valve 2 in the region of the gas supply 20, as indicated in FIG. 11.

Figure 13:
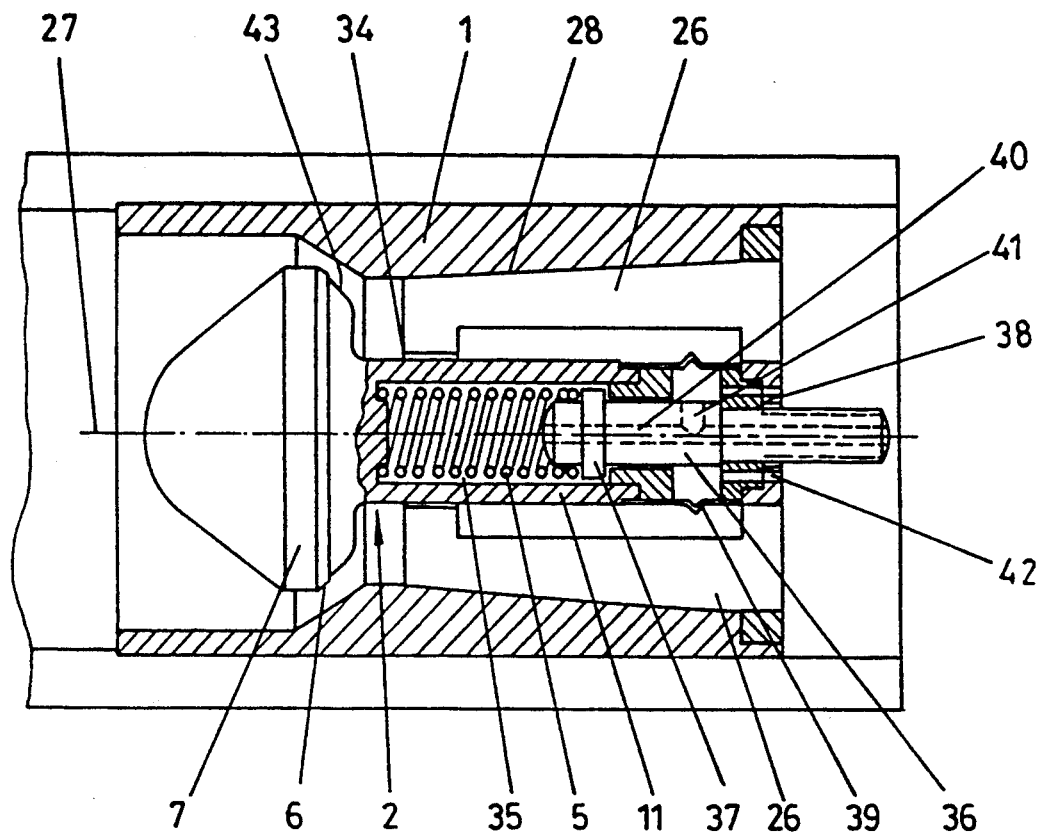
FIG. 13 shows a further modified embodiment in a presentation similar to FIG. 1.

In the embodiment shown in FIG. 13, the stem 11 of the valve is again supported by struts 26 which are constructed with schematically indicated edges 34 which delimit the sliding bearing 3 facing towards the gas supply pipe. The valve stem in this example of embodiment is hollow, and the spring 5 is accommodated in a recess 35 in the valve stem. The spring 5 operates here in conjunction with a spring retainer 37 attached, especially in an adjustable manner, to a bolt 36, the bolt 36 being supported in a bearing on the end of the struts 26 facing away from the gas supply side. The spring retainer 37 forms, together with a terminating piece of the hollow valve stem, the second sliding bearing for the valve stem 11. In the example of embodiment shown there is provided between the hollow valve stem 11 and the bearing 38 a flexible cover 39. Via a substantially axial channel 40 and a radial channel 41 joining therewith, the space delimited by the recess 35 which receives the spring 5 is connected with the space delimited by the cover 39 and, via further holes 42 in the bearing 38, with the internal space in the pipe 1. Through appropriate dimensioning of the channels and especially of the throughflow apertures 42 it is possible, in addition to the spring tension, to build up in the space 35 a gas cushion which, when the valve is moved, supports the action of the spring. Instead of channels and apertures, the bolt 36 or the spring retainer 37 can also be placed in a non-gastight manner in the hollow valve stem and can thus constitute a defined constricting point which produces the desired additional force for supporting the spring tension.

As it is sufficient, for avoiding turbulence in the region immediately adjacent to the valve head for the necessary minimum velocity of flow of the gas to be adhered to only over a short distance, there is provided, in the embodiment shown in FIG. 13, a stepped-in region 43, following on from the valve seating 6 of the valve head 7, which delimits a throughflow cross-section which increases conically. This enables the pressure loss caused by the constricting point in the region of the valve seating to be reduced. A further reduction in the pressure loss is brought abut, in this example of embodiment, too, by the conically widening limiting walls 28 in the region of the bearing, formed by the struts, for the valve or for the bolt operating together with the valve which carries the spring retainer 37.

I claim:

1. A safety closing device for a gas pipe comprising: a disc valve including a stem and a valve head having a seating surface which is capable of being pressed against a fixed valve seat provided in a tubular housing having a longitudinal axis, wherein the disc valve is movable in an axial direction of the tubular housing and is movably supported against a force exerted by a spring, and further wherein the cross-section of the valve head is smaller than a corresponding cross-section of the tubular housing and is held at a distance from an internal wall of the tubular housing; gas supply connection means provided on a side of said valve head facing away from said spring for connection to a gas supply pipe; wherein a cross-sectional area of a region of said tubular housing following the valve seat in the direction opposite to the gas supply connection increases continuously along a conical surface, such that generatrices of said conical surface enclose, with said longitudinal axis, an angle of from 3° to 10°.

2. A safety closing device as claimed in claim 1, wherein the valve stem is supported in an axially movable manner in a pair of axially spaced bearings.

3. A safety closing device as claimed in claim 1, wherein said spring is a spiral spring and is placed concentrically with the valve stem.

4. A safety closing device as claimed in claim 3, wherein said valve stem is formed with a spring retaining shoulder adjacent said valve seat and adapted to engage one end of the spring, and wherein an opposite end of the spiral spring facing away from said spring retaining shoulder is supported on one of said sliding bearings.

5. A safety closing device as claimed in claim 2, wherein said sliding bearings are supported by radial struts.

6. A safety closing device as claimed in claim 1, wherein at least one of said valve seat and said seating surface of the valve head is formed with curved generatrices.

7. A safety closing device as claimed in claim 1, wherein said spring has a progressive spring characteristic.

8. A safety closing device as claimed in claim 1, wherein said sliding bearings are formed with a plurality of radial struts. extending in the axial direction of the valve stem.

9. A safety closing device as claimed in claim 1, wherein an angle enclosed by generatrices of conical seating surfaces of the valve seat with said longitudinal axis is chosen so as to be inversely proportional to pressure in the gas supply pipe.

* * * * *